United States Patent [19]

Suh et al.

[11] Patent Number: 4,571,358

[45] Date of Patent: Feb. 18, 1986

[54] MATERIALS FOR USE IN TRIBOLOGICAL APPLICATIONS

[75] Inventors: Nam P. Suh, Sudbury; Steven M. Burgess, Auburn, both of Mass.

[73] Assignee: Massachusetts Institute of Technology, Cambridge, Mass.

[21] Appl. No.: 609,021

[22] Filed: May 10, 1984

[51] Int. Cl.$^4$ .............................................. B32B 3/10
[52] U.S. Cl. ................................. 428/155; 428/423.1
[58] Field of Search ................... 428/136, 173, 315.5, 428/315.7, 317.9, 131, 134, 141, 155, 423.1

[56] References Cited

U.S. PATENT DOCUMENTS 3,137,611  6/1964  Krolik, Jr. ........................... 428/136
3,778,332  12/1973  Butler et al. ........................ 428/220

FOREIGN PATENT DOCUMENTS 2059397  5/1971  France ................................. 428/160

Primary Examiner—William J. Van Balen
Attorney, Agent, or Firm—Arthur A. Smith, Jr.; Robert F. O'Connell

[57] ABSTRACT

A technique for improving the wear characteristics of a movable surface of a body which is to be relatively moved in contact with the surface of another body, wherein the movable surface has a plurality of void regions therein which extend from the surface into the interior of the body, the dimensions of the void regions and the spacing therebetween being generally such that wear particles generated at the interface regions between the relatively moving surfaces are removed from the interface regions into the void regions where they are entrapped.

14 Claims, 5 Drawing Figures

MATERIALS FOR USE IN TRIBOLOGICAL APPLICATIONS

INTRODUCTION

This invention relates generally to materials used for slidable surfaces and, more particularly, to unique materials and techniques for making them for improving the friction characteristics thereof.

BACKGROUND OF THE INVENTION

Over the past several decades much investigation has taken place in an attempt to understand the mechanisms of friction particularly as arising with respect to two contacting sliding surfaces. The causes of friction between sliding surfaces is generally discussed, for example, in the article "The Genesis of Friction" by N. P. Suh and H. C. Sin, WEAR, 69(1981) Elsevier Sequoia S.A., Lausanne, Switzerland, pages 91–114. In such paper the authors pointed out that friction coefficient is not an inherent material property but is composed of three principal components, one due to the deforming asperities (roughness) of the surface, another due to plowing of the surface by wear particles, and another due to adhesion.

Further study has shown that the significance of wear effects can be severe for many materials, such as plastic materials, wherein the interfacial wear debris which is generated when two surfaces are in slidable contact is shown to have very important adverse effects on the friction coefficient as well as on other related wear behavior.

Particularly in polymer-based materials, plastic or visco-elastic deformation of the interfacial wear debris can contribute significantly to the total friction coefficient and the presence thereof can cause instabilities in the time-dependent friction behavior of the material. Since it is desirable to maintain a substantially constant coefficient of friction over time it would be helpful to reduce or eliminate the effects of interfacial wear debris at the sliding interface.

DISCUSSION OF THE PRIOR ART

Those in the art have attempted to maintain a substantially constant coefficient of friction between two sliding surfaces by using a suitable, separately-applied lubricant, or grease-like substance therebetween. Still others have approached the problem by incorporating a lubricating type material, e.g., Teflon, as an integral part of the sliding surface itself. Although such approaches work well in many instances, in certain applications the presence of such lubricants, either separately or incorporated in the material itself, cannot be tolerated since they may introduce undesired contaminants or other undesired physical characteristics into the process or device in which the sliding surfaces are used. Hence, it is desirable that a technique be developed for avoiding their use while still maintaining a substantially constant coefficient of friction over a reasonable length of time, particularly where deleterious amounts of wear debris are generated during use.

BRIEF SUMMARY OF THE INVENTION

In accordance with the invention, a material is formed with relatively small voids or pockets ("microvoids") incorporated into the microstructure of the material itself, such voids being present at the slidable surface and extending below the surface well into the interior of the material. When the surface of such a material is put into slidable contact with another surface, the wear debris which is generated between the sliding surfaces becomes entrapped in the voids and is substantially removed from the interface region so that the adverse influence of the interfacial wear debris on the coefficient of friction is substantially reduced as a result.

The voids present at the surface of and extending into the interior of the microstructure of the material continue to entrap such debris during use and, accordingly, can extend the useful life of the surface by maintaining the friction coefficient at a relatively low and substantially constant value for a relatively long period of time.

Such materials can be suitably formed for such purpose, particularly when utilizing fiber-reinforced composite plastic materials, by using techniques which enhance bubble formation and promote bubble stability within the material. In accordance with one embodiment, for example, a fiber-reinforced polyurethane resin is permitted to become supersaturated with nitrogen gas under high pressure for a selected period of time, after which the pressure is quickly reduced to allow nucleation and growth of such microvoids.

DESCRIPTION OF THE INVENTION

The invention can be described in more detail with the help of the accompanying drawings wherein FIG. 1 depicts an idealized plan view of a material of the invention showing voids at the surface thereof;

Figure 3:
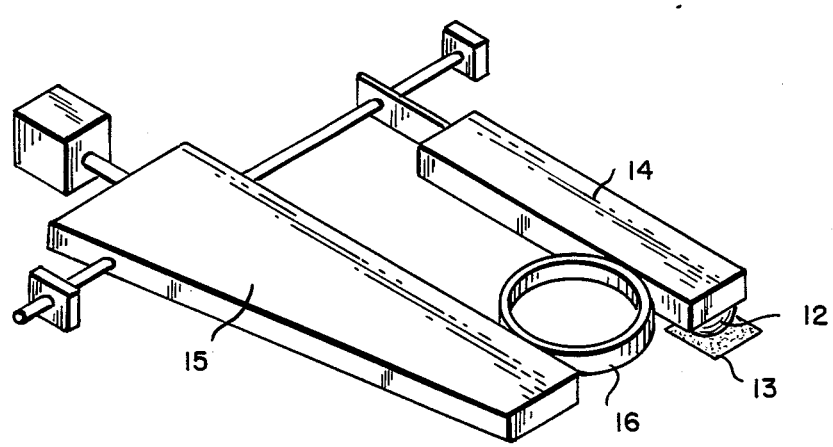
FIG. 3 depicts in diagrammatic form a friction measurement apparatus used to test the frictional behavior of the material of the invention.
Figure 4:
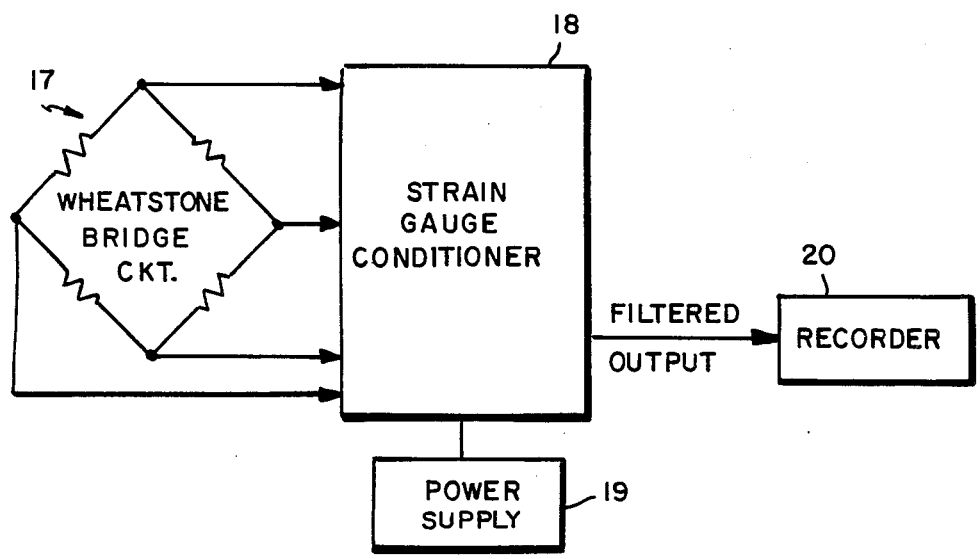
Figure 5:
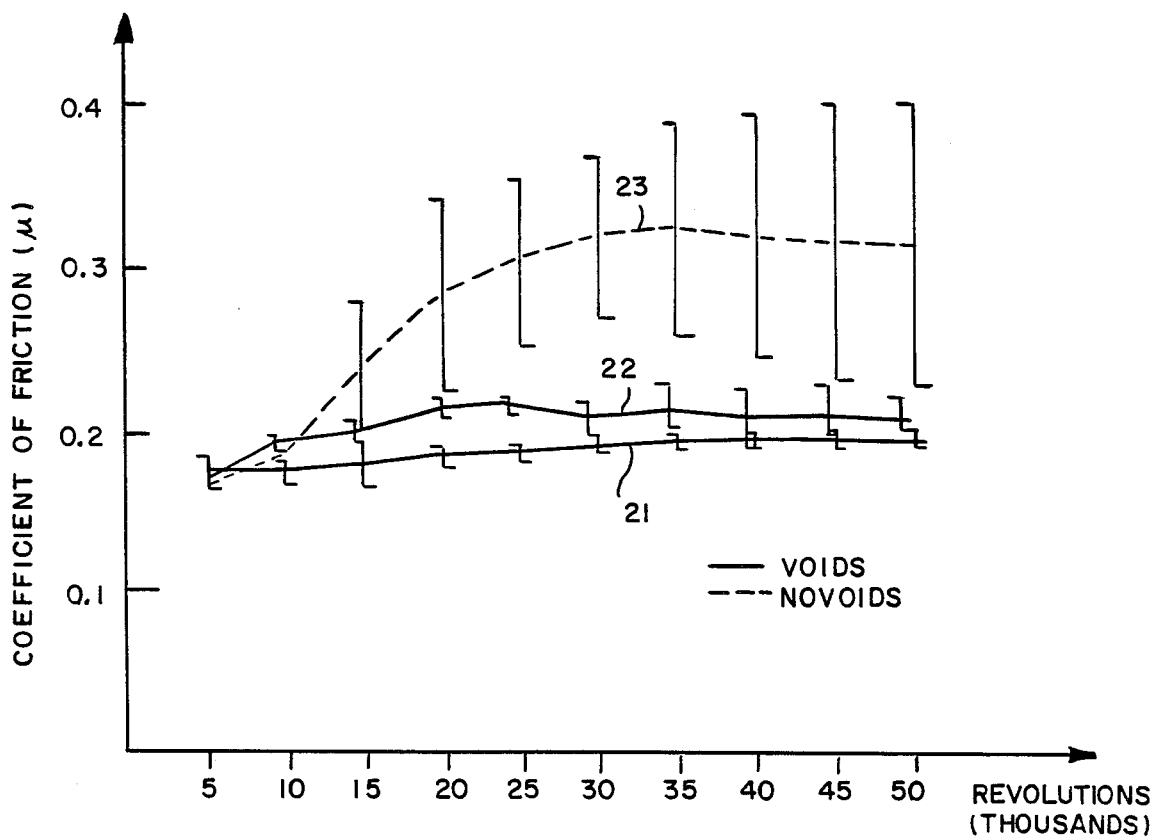

FIG. 4 depicts in block diagram form a circuit responsive to the test measurement apparatus of FIG. 3 for providing output information concerning the frictional behavior of a material of the invention; and FIG. 5 depicts a graph showing a comparison of the coefficient of friction as an effective function of time for a material with voids in accordance with the invention and a material without such voids.

It is helpful in understanding the invention to describe a particular technique for preparing a specific material in accordance with the invention and to describe a specific technique for measuring the frictional behavior thereof. As an exemplary embodiment thereof a composite material can be formed using a polyurethane resin matrix having carbon fibers therein. The matrix material can comprise a urethane elastomer prepolymer material and a suitable curative material. In one specific embodiment, for example, the urethane used was an Adiprene L-83 Urethane Rubber Prepolymer obtained from E. I. duPont de Nemours Co. of Wilmington, Delaware and the curative was a Caytur 21 Urethane Curative also obtained from duPont.

Adiprene L-83 is a urethane elastomer prepolymer based on toluene diisocyanate and polyether polyols. Caytur 21 is a blocked-delayed-reaction diamine curative. It consists of a complex of methylene diamilene (MDA) and sodium chloride dispersed in dioctyl pthalate. When left at room temperature, it reacts slowly with terminal iisocyanate groups. However, when heated above 100° C., the salt complex unblocks and the freed MDA rapidly cures the urethane elastomer. The two components were mixed in a manner such that a 95% theoretical stoichiometric amount of curative was present. Such an amount is generally considered reasonable since variations between 70% and 110% theory produce little change in vulcanizate hardness and tensile properties. A Say-5300 silicone based surfactant was added (10% by weight) to the Adiprene/Caytur mixture. The surfactant was added to both foamed and unfoamed specimens. The surfactant performs two functions: (1) it reduces the energy required to form new surfaces, leading to an enhancement of bubble formation and (2) it promotes bubble stability by equalizing the bubble surface tension.

The fibers used were Union Carbide T-300 High Strength Carbon Fibers, sized for epoxy resin, and obtained from Union Carbide Company of Danbury, Connecticut. The fiber tows, for example, were wound around a flat winding board and the resulting fiber-wound boards were impregnated with the polyurethane resin mixture. For such purpose, for example, one inch pre-pregs with fibers parallel to the long axis were cut out and laid on top of one another in a leaky mold to a thickness of approximately one inch. In a particular embodiment, a dead weight of 100 pounds was applied to the mold for ten hours to allow the excess resin to leak out. By measuring the distance between selected surfaces of the mold a "reference thickness" was obtained for the uncured samples. The uncured sample was then cut into two-inch long sections which were placed in shorter molds that could be adjusted for different amounts of volume expansion with respect to the "reference thickness". Such adjustable molds were then set for the desired volume expansion and placed in a pressure chamber. The pressure chamber was pressurized with nitrogen (exemplary pressures of 500 psi and 1500 psi were used) allowing the polyurethane resin to become supersaturated with nitrogen gas. After 24 hours, the pressure was quickly released (e.g., for about 30–40 seconds) to allow nucleation and growth of microvoids within the material. The samples were then placed in a forced air oven and cured at a temperature of 100° C. for one hour.

Figure 1:
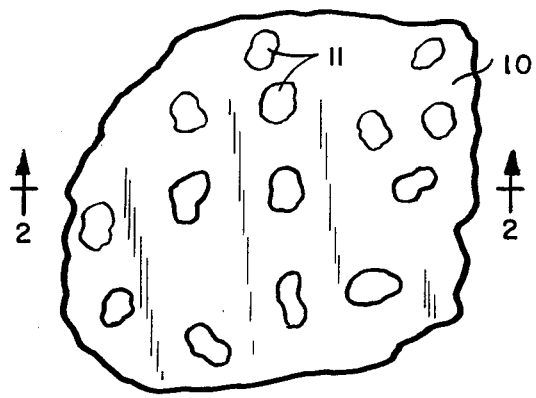
Figure 2:
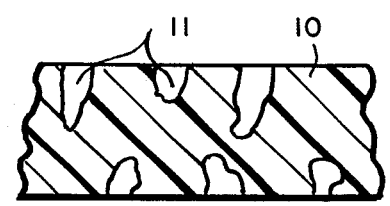
FIG. 2 depicts an idealized view in cross section of the material of FIG. 1.

Such material 10 was then found to have a plurality of voids 11, generally randomly positioned, at a desired slidable surface thereof, such voids extending into the interior of the material in the general manner shown by the idealized drawings of FIGS. 1 and 2 which represent portions of a material so formed. Appropriate samples thereof were prepared for friction and wear tests to determine the effect of such voids on the friction coefficient thereof as a function of use, i.e., as a function of time, when the surface was put into sliding contact with another surface during such use.

In forming the void regions in the material microstructure the dimensions of the void regions should be such that they are generally larger than the dimensions of the wear particles so that the latter can be readily entrapped therein. Further, the dimensions of the spaces between the void regions at the surface should be such that they are generally at least the same order of magnitude as the dimensions of the void regions themselves and preferably such that they are generally at least an order of magnitude greater than that of the void regions. Moreover, the dimensions of the spaces between the void regions are generally less than the amplitude of the motions of the slidable surfaces which are moving relative to each other and preferably such that they are generally at least an order of magnitude less than such relative motions.

In a particular testing process, for example, cured composite samples of the material were sliced into a 0.125 inch thick wafers with fibers aligned parallel to the normal of the flat wafer surface. Such samples were cut, for example, on an Isomet 11-1180 low-speed saw using a low concentration diamond blade in water as a lubricant. The samples were then positioned on a polyester resin mount and polished in the same manner as metallurgical specimens (e.g., using 240, 320, 600 grit silicon carbide paper and 0.3 and 0.05 microna lummina). The bottom surface of the polyester mount was machined on a surface grinder so that the top and bottom surfaces remain parallel, ensuring that the samples would run "true" during the friction and wear tests. To ensure the removal of polishing debris, the samples were brushed with distilled water and vacuum cleaned with a pipette connected to a water trap and vacuum pump. Finally the samples were allowed to dry for at least ten hours in a dessicator containing calcium chloride crystals. A ½" diameter 52100 steel ball bearing was used as a sliding counterface. The ball bearing was not polished but was cleaned with electronics-grade acetone to ensure against the possibility of lubrication by contaminants A mechanical friction and wear testing setup, as shown diagrammatically in FIG. 3, was employed for such comparison tests and was very similar to well-known standard pin-on-disc type friction test apparatus. Instead of a steel pin, however, a fixed ball bearing 12 was used to eliminate alignment problems. The composite sample 13 was clamped to a suitable rotating table (not shown). The fixed ball bearing, mounted on a fixed arm 14 of the apparatus, contacted the composite material off-center with respect to the axis of rotation, thereby producing a circular wear track. The friction force caused a deflection of a flexible arm 15 of the apparatus, which in turn elastically deformed an aluminum strain ring 16 in a manner which would be well-known to those in the art.

The strain ring, or gauge was electrically connected in one arm of a simple Wheatstone bridge circuit 17, as shown in block diagram in FIG. 4, the output of the Wheatstone strain gauge bridge 17 being amplified by a suitable gauge amplifier, e.g., one constructed from a model 2B30-J Strain Gauge Conditioner 18 and a model 902-B DC power supply 19, both made and sold by Analog Devices, Inc. of Westwood, Massachusetts, for example. The strain gauge amplifier allowed for appropriate gain adjustments for calibration of the strain ring, for adjustment of the excitation voltage, for providing a filtered output and for providing a wide selection of cut-off frequencies for the filtered output as would be well known to those in the art. The filtered output can be supplied to an appropriate pen recorder 20, such as a Fisher Pen Recorder.

In a particular test setup an average friction coefficient was measured by adjusting the filter for a cut-off frequency of 2 Hz and recording the output on the Fisher Pen Recorder.

A comparison of the friction coefficient versus the number of revolutions of the composite sample 11, both for void and non-void samples, is shown in FIG. 5 for up to 50,000 revolutions. It should be noted that the frictional behavior for the first 5000 revolutions is not plotted and the reason therefor can be explained as follows. At the very onset of the sliding test both void and non-void samples exhibited a relatively high friction coefficient (approximately 0.35 to 0.45). However, in the span of approximately 1000 revolutions a transient effect occurs in all samples. During the transit time the coefficient drops from such high values to a lower value (approximately 0.2) close to a steady state value which is observed at about 5000 revolutions. The latter value is then taken for comparison purposes as the initial value which it was desired to maintain. The data was taken from, and averaged for, four tests on one void sample and four tests on each of two void samples. The samples were ground, polished, cleaned, and dried between tests.

As can be seen in FIG. 5, as the sliding test proceeded, there was a marked difference in the frictional behavior between the non-void sample and the void samples. The non-void sample shown by dashed-line curve 23 experienced a relatively large increase in average friction coefficient, attaining values as high as 0.43 in some tests. The relatively large scatter in the friction values for the non-void sample (shown by the vertical bars associated with curve 23) is the result of two occurrences. First, the rate of increase in friction varied from test to test and, second, some of the tests on the non-void sample experienced a subsequent decrease in friction after reaching and maintaining a peak value.

As shown by curves 21 and 22 for the two void samples, it can be seen that both samples exhibited similar stable, but very slowly increasing, friction coefficients (from approximately 0.182 to 0.20) over a time period representing 50,000 revolutions. Moreover, the scatter in the data for the void samples is significantly less than for the non-void sample.

The use of two completely independent sets of void samples which were separately processed, prepared, and tested confirms that the low friction exhibited by the void samples is repeatable and is not the result of contamination which might have arisen during sample preparation. The void size distribution is similar in both void samples although in the particular samples tested the void volume percent (approximately 13%) of the void sample for curve 22 is less than that (approximately 17%) for curve 21.

The comparative data shown in FIG. 5 demonstrates that the incorporation of voids in the material microstructure, in accordance with the invention, leads to a significant reduction in the friction coefficient of a slidable surface over time, in comparison with materials not using such voids, i.e., the maintenance of a stable, low coefficient of friction over an extended period of use.

The above description discloses a particular embodiment of the invention as applied to a articular material in which the voids are formed in a specified manner which has proved effective for such material. The use of other techniques for forming voids in other materials can be devised within the skill of those in the art within the spirit and scope of the invention. Hence, this invention is not to be construed as limited to the particular embodiment discussed above, except as defined by the appended claims.

What is claimed is:

1. A material having a surface which can be placed in movable contact with another surface, said material having a plurality of microscopic void regions spaced at microscopic distances from each other and extending from the movable surface thereof partially into the interior regions of said material so that, when the movable surface of said material is moved relative to said another surface, microscopic wear particles generated at the interface between said moving surfaces are removed from said interface into said void regions of said material for entrapment therein.

2. A material in accordance with claim 1 wherein the dimensions of said void regions are generally larger than the dimensions of said wear particles.

3. A material in accordance with claim 1 wherein the dimensions of the spaces between the void regions at the surface of said material are generally at least the same order of magnitude as the dimensions of said void regions.

4. A material in accordance with claim 3 wherein the dimensions of the spaces between said void regions are generally at least an order of magnitude larger than the dimensions of said void regions.

5. A material in accordance with claim 1 wherein the dimensions of the spaces between said void regions at the surface of said material are generally less than the amplitude of the relative motion of the moving surfaces.

6. A material in accordance with claim 5 wherein the dimensions of the spaces between said void regions are generally at least an order of magnitude less than the amplitude of the relative motion of the moving surfaces.

7. A material in accordance with claim 1 wherein said material is a fiber-reinforced composite plastic material.

8. A material in accordance with claim 7 wherein said plastic is a polyurethane resin.

9. A material in accordance with claim 8 wherein said polyurethane resin is a mixture of a urethane elastomer prepolymer material and curative material.

10. A material in accordance with claim 9 wherein said mixture further includes a surfactant.

11. A material in accordance with claim 1 wherein said void regions are formed therein by saturating said material with a selected gas under pressure, rapidly releasing said pressure to allow the nucleation and growth of said void regions; and curing said material at a selected temperature.

12. A material in accordance with claim 11 wherein said gas is nitrogen.

13. A material in accordance with claim 11 wherein said pressure is within a range from about 500 psi to about 1500 psi, said pressure being released over a time period of less than one minute.

14. A material in accordance with claim 11 wherein said curing temperature is about 100° C.

* * * * *